United States Patent
Gelonese (10) Patent No.: US 10,243,369 B2
(45) Date of Patent: Mar. 26, 2019

(54) POWER ALLOCATION SYSTEM

(71) Applicant: Embertec Pty Ltd, Dulwich, South Australia (AU)

(72) Inventor: Domenico Gelonese, Dulwich (AU)

(73) Assignee: Embertec Pty Ltd (AU)

( * ) Notice: Subject to any disclaimer, the term of this patent is extended or adjusted under 35 U.S.C. 154(b) by 549 days.

(21) Appl. No.: 14/870,168

(22) Filed: Sep. 30, 2015

(65) Prior Publication Data

US 2016/0099571 A1    Apr. 7, 2016

(30) Foreign Application Priority Data

Oct. 1, 2014  (AU) ................................ 2014903923

(51) Int. Cl.
*H02J 3/38*       (2006.01)
*H02J 9/06*       (2006.01)
(Continued)

(52) U.S. Cl.
CPC .............. *H02J 3/386* (2013.01); *H02J 3/32* (2013.01); *H02J 3/383* (2013.01); *H02J 13/0075* (2013.01); *H02J 13/001* (2013.01); *H02J 2003/146* (2013.01); *Y02B 70/3216* (2013.01); *Y02B 90/222* (2013.01); *Y02B 90/2653* (2013.01); *Y02E 10/563* (2013.01); *Y02E 10/566* (2013.01); *Y02E 10/763* (2013.01); *Y02E 40/72* (2013.01); *Y02E 70/30* (2013.01); *Y04S 10/123* (2013.01); *Y04S 10/40* (2013.01);
(Continued)

(58) Field of Classification Search
CPC .... H02J 3/386; H02J 3/32; H02J 3/383; H02J 13/0075; H02J 13/001; H02J 2003/146; H02J 13/00; Y02B 70/3216; Y02B 90/222; Y02B 90/2653; Y02E 10/563; Y02E 10/566; Y02E 10/763; Y02E 40/72; Y02E 70/30; Y04S 10/123; Y04S 10/40; Y04S 20/12; Y04S 20/221; Y04S 20/224; G06Q 50/06; G05D 11/00
USPC .............................................. 307/11–42; 1/1
See application file for complete search history.

(56) References Cited

U.S. PATENT DOCUMENTS

| 4,901,007 A | 2/1990 | Sworm |
| 5,721,934 A | 2/1998 | Scheurich |

(Continued)

FOREIGN PATENT DOCUMENTS

| AU | 2011 101402 A4 | 12/2011 |
| AU | 2012 100197 A4 | 3/2012 |

(Continued)

*Primary Examiner* — Brandon S Cole
(74) *Attorney, Agent, or Firm* — Craig A. Fieschko, Esq.; DeWitt LLP (57) ABSTRACT

A hub device controls an electrical energy state of one or more appliances, and controls an alternative electricity supply such as a solar generation installation whose output is non-constant such that sometimes the electrical energy available from the alternative electrical supply is greater than the electrical energy demand from the appliances, and at other times the electrical energy available from the alternative electrical supply is less than the electrical energy demand from the appliances. The hub device may control the alternative electricity supply and/or the appliances such that the electrical energy available from the alternative electrical supply is matched to the electrical energy demand from the appliances.

20 Claims, 3 Drawing Sheets

(51) Int. Cl.
*H02J 4/00* (2006.01)
*H02J 13/00* (2006.01)
*H05B 6/68* (2006.01)
*H02J 3/32* (2006.01)
*H02J 3/14* (2006.01)

(52) U.S. Cl.
CPC .............. *Y04S 20/12* (2013.01); *Y04S 20/221* (2013.01); *Y04S 20/224* (2013.01); *Y04S 40/126* (2013.01)

(56) References Cited

U.S. PATENT DOCUMENTS

| | | | |
|---|---|---|---|
| 6,092,209 | A | 7/2000 | Holzhammer et al. |
| 6,476,729 | B1 | 11/2002 | Liu |
| 7,380,142 | B2 | 5/2008 | Lee et al. |
| 8,190,940 | B2 | 5/2012 | Gelonese |
| 8,362,918 | B2 | 1/2013 | Choi et al. |
| 8,373,303 | B1* | 2/2013 | Daniels ............ H02J 7/35 307/23 |
| 8,386,369 | B2 | 2/2013 | Warnick |
| D700,579 | S | 3/2014 | Mobbs |
| 9,523,991 | B2* | 12/2016 | Baba ............ G05F 1/66 |
| 9,696,774 | B2* | 7/2017 | Han ............ G06F 1/26 |
| 9,735,613 | B2* | 8/2017 | Orthlieb ............ H02J 7/35 |
| 9,798,298 | B2* | 10/2017 | Kaulgud ............ G05B 13/02 |
| 2002/0041126 | A1* | 4/2002 | Provanzana ............ H02J 3/28 307/48 |
| 2005/0030680 | A1 | 2/2005 | Lee et al. |
| 2005/0289378 | A1 | 12/2005 | Vorenkamp et al. |
| 2006/0101294 | A1 | 5/2006 | Lee et al. |
| 2008/0106148 | A1 | 5/2008 | Gelonese |
| 2009/0235107 | A1 | 9/2009 | Gelonese |
| 2010/0070785 | A1* | 3/2010 | Fallin ............ G08B 13/248 713/320 |
| 2010/0095146 | A1 | 4/2010 | Gelonese |
| 2010/0156666 | A1 | 6/2010 | Choi et al. |
| 2010/0191487 | A1* | 7/2010 | Rada ............ G05F 1/70 702/60 |
| 2011/0106687 | A1 | 5/2011 | Warnick |
| 2011/0121648 | A1* | 5/2011 | Pan ............ H02J 3/14 307/26 |
| 2011/0254371 | A1 | 10/2011 | Galsim et al. |
| 2012/0068534 | A1* | 3/2012 | Pan ............ H02J 4/00 307/26 |
| 2012/0080949 | A1 | 4/2012 | Gelonese |
| 2012/0209438 | A1* | 8/2012 | Cruickshank, III ... G06Q 10/00 700/286 |
| 2012/0312989 | A1 | 12/2012 | Gelonese |
| 2014/0142774 | A1* | 5/2014 | Katayama ............ G06Q 50/06 700/291 |
| 2014/0285019 | A1 | 9/2014 | Gelonese |
| 2014/0292289 | A1 | 10/2014 | Gelonese |
| 2014/0310744 | A1 | 10/2014 | Gelonese |
| 2015/0039429 | A1 | 2/2015 | Gelonese |
| 2015/0256032 | A1 | 9/2015 | Gatto |
| 2015/0270743 | A1* | 9/2015 | Orthlieb ............ H02J 3/00 165/288 |

FOREIGN PATENT DOCUMENTS

| | | |
|---|---|---|
| AU | 2012 101351 A4 | 9/2012 |
| CA | 2585966 A1 | 5/2006 |
| CA | 2743270 A1 | 5/2010 |
| CA | 2719683 A1 | 5/2011 |
| CN | 1773399 A | 5/2006 |
| CN | 102292895 A | 12/2011 |
| CN | 102356363 A | 2/2012 |
| EP | 1612910 A1 | 1/2006 |
| EP | 2356525 A2 | 8/2011 |
| JP | 2003 271812 A | 9/2003 |
| JP | 2006 139745 | 6/2006 |
| JP | 2011 010436 A | 1/2011 |
| KR | 20100075283 A | 7/2010 |
| NO | 20072468 A | 5/2007 |
| TW | 201031072 A | 8/2010 |
| WO | WO 03062973 A1 | 7/2003 |
| WO | WO 2006 052047 | 5/2006 |
| WO | WO 2008 077198 A1 | 7/2008 |
| WO | WO 2010 057343 A2 | 5/2010 |
| WO | WO 2010 074392 A1 | 7/2010 |
| WO | WO 2010 139020 A1 | 12/2010 |
| WO | WO 2012/075059 A2 | 6/2012 |
| WO | WO 2013 006916 A1 | 1/2013 |
| WO | WO 2013 056310 A1 | 4/2013 |
| WO | WO 2013 131147 A1 | 9/2013 |
| WO | WO 2014 094031 A1 | 6/2014 |

\* cited by examiner

POWER ALLOCATION SYSTEM

FIELD OF THE INVENTION

The present invention relates to the field of energy demand management and control in an electricity distribution network including customer solar capacity.

BACKGROUND OF THE INVENTION

The following references to and descriptions of prior proposals or products are not intended to be and are not to be construed as statements or admissions of common general knowledge in the art. In particular, the following prior art discussion does not relate to what is commonly or well known by the person skilled in the art, but may assist in the understanding of the inventiveness of the present invention, of which the identification of pertinent prior proposals is but one part.

Rising prices paid by consumers for electricity supply is an issue of concern to many householders. There is also world-wide disquiet about the use of fossil fuels for electricity generation. There is concern that such use is wasteful of a non-renewable resource, and also that such use generates carbon dioxide emissions which may contribute to global warming.

In response to these concerns, electricity generation equipment has been installed in many domestic and business premises. Such electricity generation installations have included wind generation and various forms of cogeneration, with the most common being solar electricity generation, in particular roof-mounted solar photovoltaic (PV) generation equipment.

The output of a solar generation installation varies with the availability of solar radiation. Time of day, time of year and weather conditions affect the available solar radiation and hence the level of electricity generated by the solar installation.

The demand for electricity by a household also varies depending on what appliances are in use, and the degree of use of the appliances.

This combined variability means that at some times, the solar generation installation will be able to generate more electricity than the current household demand, while at other times, the household demand will exceed the level of electrical power available from the installation.

When the household demand exceeds the solar supply, electrical energy is drawn from the grid. Conversely, when the solar supply exceeds household demand, the energy utility which provides the grid may allow the household to supply, or "feed-in", electricity to the grid. The energy utility may pay for this generated electricity either directly or by rebate from the consumer's electricity bill. This payment is sometimes called a "feed-in tariff."

The availability of this feed-in tariff is intended to encourage the installation of solar generation capacity in domestic and business premises. This is advantageous as a matter of public policy because of the reduction of the use of fossil fuels for generation of electricity. Local generation which is aligned to peak usage may also reduce the need to install electricity transmission infrastructure in order to meet peak demand which is unused outside peak periods.

A problem arises in some circumstances due to the fact that solar installations are not directly controlled by the energy utility, either in installation or operation. In some instances this has led to problems with grid stability. Where a significant solar generation capacity exists, uncontrolled, rapid changes in the generation capacity on the grid may occur. The grid operator must adapt to this using the generation and distribution assets which are under the operator's direct control. As the amount of solar generation increase, this may become difficult or impossible.

Some energy utilities have reacted to this by requiring that solar installations either do not feed-in any electricity to the grid, or that they make no net feed-in over a specified period.

In general, existing solar installations do not have the capacity to determine or act upon the energy demand of the premises in which they are installed.

SUMMARY OF THE INVENTION

In one form of this invention there is proposed a hub device able to control a power state of one or more appliances (i.e., electrical loads), where the appliances are provided with electrical energy from a mains electricity supply. The hub can control an alternative electricity supply which is able to supply the appliances. The electricity supply available from the alternative supply is non-constant such that during a first time period the electrical energy available from the alternative electrical supply is greater than the electrical energy demand from the appliances, and during a second time period the electrical energy available from the alternative electrical supply is less than the electrical energy demand from the appliances. The hub device can control the alternative electricity supply such that during the first time period, that is when the alternative energy supply capacity exceeds the demand for energy from the household, the electrical energy available from the alternative electrical supply is reduced to a level which does not exceed the electrical energy demand from the appliances.

In preference, the hub device is adapted to control the power state of the appliances such that during said first time period the electrical energy available from the alternative electrical supply is increased to a level which does not exceed the electrical energy supply available from the alternative energy supply. This allows for maximum use of the available alternative energy supply, without exporting energy to the grid.

In preference, hub device controls the power state of the appliances to shift at least some electrical energy demand from said first time period to said second time period.

In preference, the power state control is to toggle an appliance between ON and OFF state.

In preference, the control of the power state of an appliance is control of the degree of function of an appliance, such as setting a thermostat, or placing an appliance in a standby power state.

In general, the marginal cost of electricity from the alternative supply is less than the marginal cost of electricity from the mains supply. In the case of a solar energy supply as the alternative energy supply, the marginal cost is essentially zero. The hub device is able to control the appliances, the output of the alternative energy supply and the choice of electricity supply used to supply electrical energy to the appliances so as to minimize the cost of electricity supplied to the appliances.

In preference, the hub device controls the flow of electrical energy to a storage battery such that during said first time period the sum of the flow of electrical energy to the storage battery and the electrical energy demand of the appliances approximately equals the electrical energy available from the alternative electrical energy supply. (In this respect, "approximately equals" should be understood as meaning greater than 95%, i.e., the sum of electricity supplied to the battery and drawn by the appliances is 95%-100% of available electricity from the alternative supply.)

In preference, the hub device stores performance data about the previous performance of the alternative electrical energy supply and receives and stores environmental data describing the environment in which the hub device is operating, for example one or more of temperature, behavior of a dwelling occupant, time of day, day of week, time of year, presence of a dwelling occupant and cloud cover, where the hub device correlates past performance and environmental data and uses such correlations along with current and predicted environmental data values in order to determine scheduling of appliance activation and alternative electrical energy supply use.

In preference, the alternative electrical energy supply is selected from a solar electrical energy system, a wind turbine electrical energy system, and a co-generation electrical energy system.

In a further form, the invention may be said to lie in a method of control of an electrical energy generation installation wherein the output electrical energy of the installation is maintained at a level which does not exceed the electrical energy demand of a selected group of appliances, said appliances being co-located with the electrical energy generation installation.

In preference the method includes increasing the electrical energy demand of at least one of the group of appliances in order to maintain the output electrical energy of the installation at or below the electrical energy demand of the appliances.

In preference the method includes reducing the output electrical energy of the electrical generation installation in order to maintain the output electrical energy of the installation at or below the electrical energy demand of the appliances.

In preference the electrical energy generation installation is a domestic solar power generation installation.

Further advantages, features, and objects of the invention will be apparent from the remainder of this document in conjunction with the associated drawings.

DETAILED DESCRIPTION OF PREFERRED VERSIONS OF THE INVENTION

Figure 1:
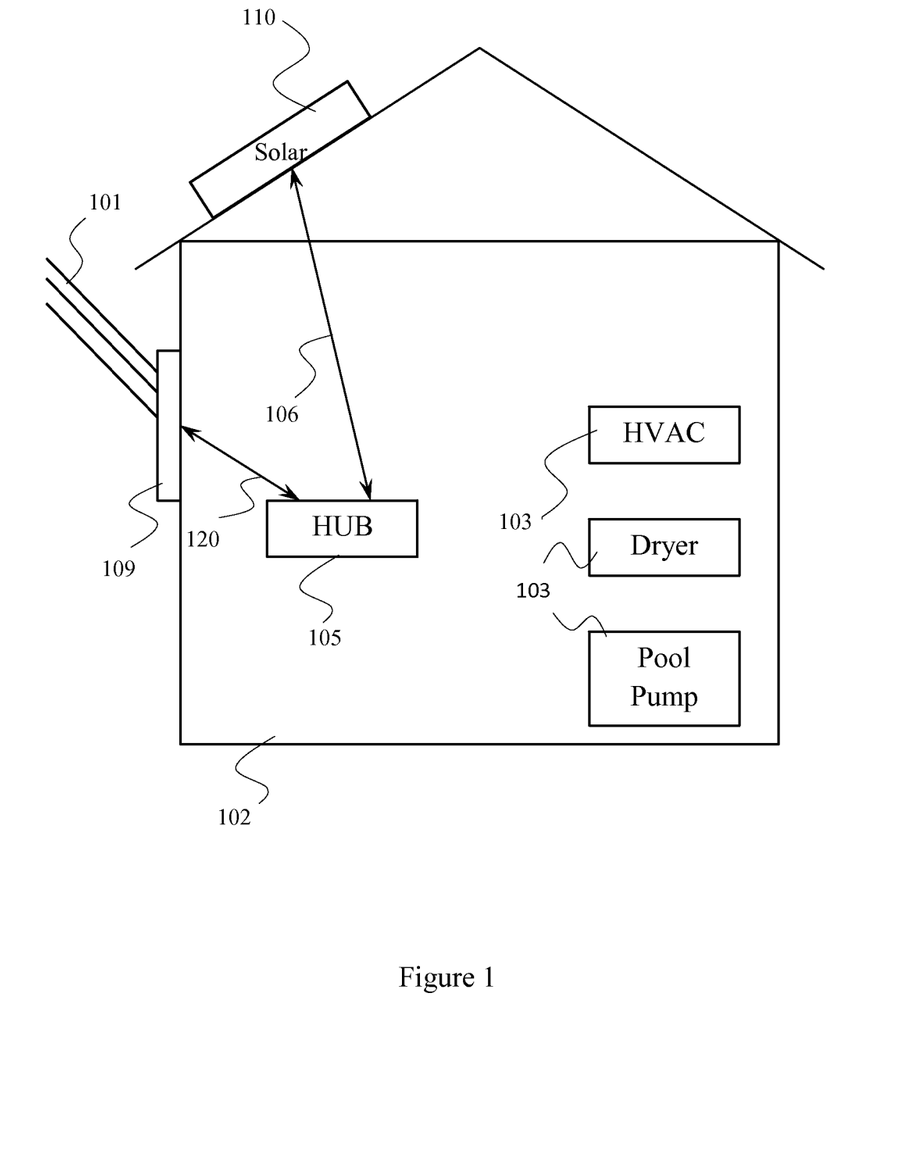
FIG. 1 is a diagrammatic representation of an installation including an exemplary version of the invention.

Now referring to the illustrations and in particular to FIG. 1, an electrical distribution grid 101 supplies electricity to consumer premises 102. The consumer in the consumer premises 102 has a demand for electricity to power one or more appliances 103.

The consumer premises 102 also includes a solar electricity generation installation 110. This installation 110 provides an alternative electricity supply in the form of solar panels for generating electricity from energy provided by the sun, and associated electrical equipment for making that electricity available to the premises appliances 103 and/or the electrical distribution grid 101. The amount of electrical energy available to be supplied by the solar installation 110 at any moment varies depending upon the amount of sunlight available to the solar panels.

A hub 105 is provided in the consumer premises 102. The hub 105 includes a communication transceiver 106 which allows the hub 105 to communicate with the solar power installation 110. In the illustrated embodiment, the communication is via wifi links 106. Other communications links may be used, including other wireless protocols such as ZigBee. Alternative communication means such as wired Ethernet or power line signalling systems may be used. A combination of communication links may be used, such that the hub 105 has multiple communication transceivers.

The solar installation 110 is able to communicate data to the hub 105 concerning the electricity supply that the solar power installation 110 is making, or is capable of making, to the premises 102 or grid 101. The solar power installation 110 is able to be controlled as to the fraction of the available electrical energy which the installation 110 actually does supply to the grid 101 or premises 102.

The hub 105 is in data communication with a device 109 which is able to measure the electricity consumption of the household 102 in real time or with a high degree of granularity. In the illustrated embodiment this is a Smartmeter 109 which performs the function of metering the electricity usage of the premises 102. The Smartmeter 109 includes a data communication capability which may be provided by any suitable wired or wireless protocol. In a preferred embodiment the Smartmeter 109 includes Zigbee communication capability 120. The hub 105 may be "paired" with the Smartmeter 109, enabling the hub 105 to receive data detailing the electrical current flows into (or out of) the premises 102. The Smartmeter 109 may also include a wide area communication capability which may be a Zigbee mesh network or any other suitable wired or wireless communication capability.

In an alternative embodiment, the hub 105 may include, or be in data communication with, current measuring devices such as "current clamps" 109 which are placed around the incoming electricity conductors of the premises 102 and which allow the electrical current flowing to (or from) the premises 102 to be measured and this information made available to the hub 105.

The electricity utility which provides electricity to the household 102 requires that the household 102 not export energy to the electricity grid 101. This requirement may be for grid stability reasons or for economic reasons, or any other reason.

The hub 105 continuously determines from the Smartmeter 109 (or current clamp 109) data that the net electrical energy flow from the grid 101 is into the household 102, that is, the energy demand of all the electrical appliances 103 (including electrical loads such as lighting) exceeds the electrical energy output of the solar power system 110. When the hub 105 detects that this is not the case, that is, electrical energy is being exported to the grid 101, the hub 105 acts to control the solar installation 110 such that the output of the solar installation 110 is reduced to a level below the electrical energy demand of the household 102.

Figure 2:
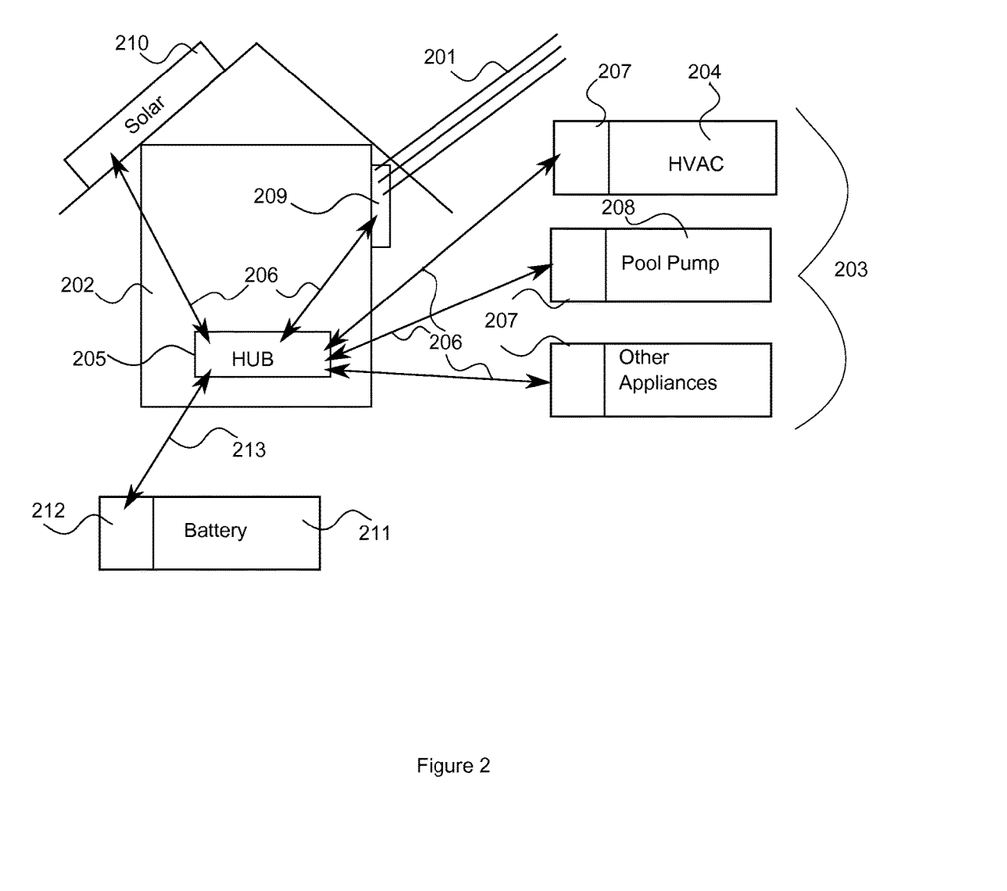
FIG. 2 is a diagrammatic representation of a further installation including an exemplary version of the invention.

Referring now to FIG. 2, an embodiment of the hub capable of varying the demand of the household, as well as, or instead of, varying the output of the solar installation is shown.

An electrical distribution grid 201 supplies electricity to consumer premises 202. The consumer in the consumer premises 202 has a demand for electricity to power one or more appliances 203. The use, or degree of use, of at least some of these appliances 203 may be considered discretionary by the consumer. These may include such appliances as HVAC equipment 204 and swimming pool pumps 208. These appliances may be termed discretionary use appliances. Such appliances have a usage pattern which allows the overall function of the appliance to be achieved even with changes in the time or intensity of use.

Considering the example of a swimming pool pump 208, a consumer requires this to operate for a fixed amount of time per day, in order for the pool water to be properly filtered. However, the consumer generally has no requirement that the pump 208 be operating at specific times. So long as the total time of operation per day is met, the consumer does not care if the pump 208 operates during the day or at night, in a single continuous period, or a number of shorter periods.

In the case of HVAC equipment 204, the function the consumer requires is to keep a space at an acceptably comfortable temperature during periods when the space is in use by the consumer. In general, a consumer will select a temperature considered optimum. However, what is "acceptable" is subjective. Accordingly, a suitably motivated consumer may be prepared to allow the temperature to vary from the optimum in a direction which will cause the HVAC equipment 204 to consume less electrical energy.

HVAC equipment 204 also functions in a system with thermal inertia. A house, once cooled below or heated above ambient temperature, will take time to return to ambient temperature, with this time being increased by the degree of heating or cooling. This can allow heating or cooling functions to be moved in time without causing unacceptable temperatures to be experienced by a user. For example, an unoccupied house may be cooled to below an acceptable minimum temperature and the HVAC equipment 204 then turned off, in the knowledge that by the time the house is to be occupied, the temperature will have again risen to be at an acceptable level. The HVAC equipment may then not be operated until the temperature reaches a maximum acceptable value which is above the minimum acceptable temperature.

This compares with non-discretionary appliances such as refrigerators, freezers and basic lighting, where any variation in time of use or intensity of use will compromise the delivery to the consumer of the function of the appliance. For example, in order for a freezer to achieve its function of keeping food frozen and unspoiled, the freezer must consume energy to maintain a set temperature. Turning the freezer off, or allowing the set temperature to rise, will compromise this function.

The consumer premises 202 also includes a solar electricity generation installation 210. This installation 210 includes solar panels for generating electricity from energy provided by the sun, and associated electrical equipment for making that electricity available to the premises appliances 203 and/or the electrical distribution grid 201. The amount of electrical energy available to be supplied by the solar installation 210 at any moment varies depending upon the amount of sunlight available to the solar panels.

There may also be a battery storage installation 211. Batteries act as a storage mechanism for electrical energy, able to act as either a load, drawing energy from the grid or from the solar installation, or as an energy source supplying energy to the premises appliances 203 and/or the grid 201.

The connection of the house 202 to the electricity supply grid 201 may be done in such a way that electricity may be supplied to the grid 201 from the solar installation 210 or the battery storage installation 211.

A hub 205 is provided in the consumer premises 202. The hub 205 includes a communication transceiver 206 which allows the hub 205 to communicate with corresponding transceivers in or associated with the discretionary use appliances 203 in the consumer premises 202. In the illustrated embodiment, the communication is via wifi links. Other communications links may be used, including other wireless protocols such as ZigBee. Alternative communication means such as wired Ethernet or power line signalling systems may be used. A combination of communication links may be used, such that the hub 205 has multiple communication transceivers.

Each of the discretionary use appliances 203 includes, or is associated with, a Communications and Control Module (CCM) 207. This CCM 207 includes a transceiver able to communicate with the hub 205, and means to control, at least in part, the electrical energy consumption of the appliance. The nature of this control will be dependent on the nature of the appliance. For appliances such as pool pumps, only simple on/off control may be available. For HVAC equipment, the ability to control a thermostat setting may be included. Where the HVAC equipment has zone controls, these may also be available to the CCM 207. The CCM 207 is able to communicate the state of the controls to which it has access, to the hub 205, and to receive instructions from the hub 205 to change the state of those controls. The CCM 207 is also able to determine, and to communicate to the hub 205, the current electrical energy usage of the controlled device.

The battery 211, if provided, includes its own CCM 212. This provides data to the hub 205, via communication link 213, which describes the capacity and charge or discharge rate of the battery 211. The CCM 212 may also include functionality to connect and disconnect the battery 211 from the electrical supply of the household 202 and/or from direct connection to the grid 201.

The hub 205 includes a user interface, allowing the consumer to interact with the hub 205. The hub 205 is able to identify, or have identified to it by a user, all of the discretionary use appliances 203 which it is able to control. This includes the nature of the available control in each case, and the electrical energy consumption characteristics of the appliance.

The solar power installation 210 is in communication with the hub 205. The solar installation 210 is able to communicate to the hub 205 data concerning the electricity supply that the solar power installation 210 is making, or is capable of making, to the premises 202 or grid 201. The solar power installation 210 is able to be controlled as to the fraction of the available electrical energy which the installation 210 actually does supply to the grid 201 or premises 202.

The battery storage installation 211 is in data communication with the hub 205 via CCM 212. The CCM 212 is able to communicate to the hub 205 the amount of electrical energy which the battery installation 211 is able to draw or supply at any time. The CCM 212 is then able to control the battery installation 211, under the control of the hub 205, to draw or supply energy.

The hub 205 is in data communication with a device 209 which is able to measure the electricity consumption of the household 202 in real time or with a high degree of granularity. In the illustrated embodiment this is a Smartmeter 209 which performs the function of metering the electricity usage of the premises 202. The Smartmeter 209 includes a data communication capability which may be provided by any suitable wired or wireless protocol. In a preferred embodiment the Smartmeter 209 includes Zigbee communication capability. The hub 205 may be "paired" with the Smartmeter 209, enabling the hub 205 to receive data detailing the electrical current flows into (or out of) the premises 202. The Smartmeter 209 may also include a wide area communication capability which may be a Zigbee mesh network or any other suitable wired or wireless communication capability.

In an alternative embodiment, the hub 205 may include, or be in data communication with, current measuring devices such as "current clamps" 209 which are placed around the incoming electricity conductors of the premises 202 and which allow the electrical current flowing to (or from) the premises 202 to be measured and this information made available to the hub 205.

In a further feature, the hub 205 may receive usage data from one or more discretionary use appliances 203, without exerting control over the appliances 203. This data details the use of the appliance 203 when under the control of a user including such information as time of day used, and settings used such as power levels or thermostat settings. Such data may also be gathered from appliances 203 whose use is not discretionary and which the hub 205 does not have the means to control. Where appliances 203 do not have an associated CCM 207, the usage data of the appliance 203 may be gathered via data from the Smartmeter or current clamp 209. This data may be analyzed to disaggregate individual appliance use.

The hub 205 may also receive other data from other sensors or from other data sources including data such as ambient temperature, location of people within the house and time of day, week, month and year. Sensors for detecting these parameters may be provided integrally with the hub 205, or may be remote from the hub 205 and in wired or wireless communication with the hub 205. The remote sensors may be devices independent of the hub 205, but able to communicate in a way which the hub 205 can monitor, such as thermostats with wireless communication.

The data may also be gathered from remote data sources, for example, approximate temperature outside the house 202 may be gathered from a weather bureau via an internet connection.

Figure 3:
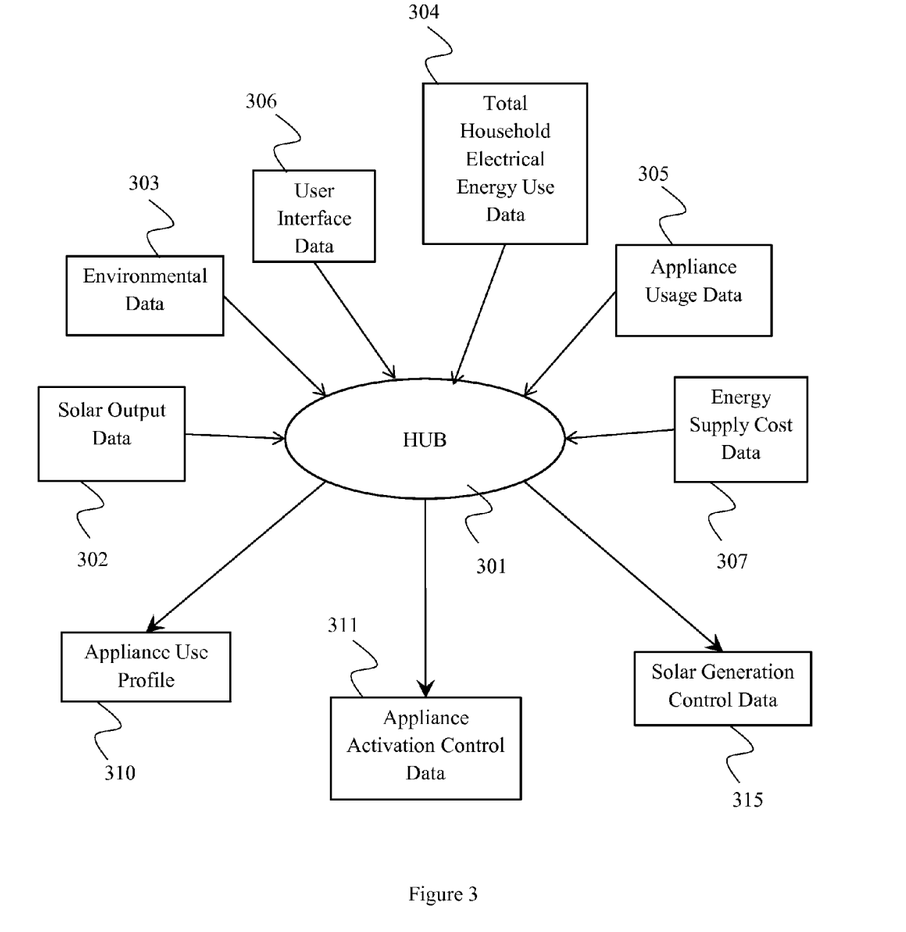
FIG. 3 is a diagrammatic representation of the operation of an exemplary version of the invention.

The operation of the hub 205 is shown diagrammatically in FIG. 3. The hub 301 receives a number of types of data. The hub 301 receives solar output data 302, which details the instantaneous electrical energy available from the solar installation 210. As part of this data 302, or separately communicated, the hub 301 also receives data as to the maximum electrical energy available from the solar installation 210.

The hub 301 may receive environmental data 303. This is data concerning the ambient temperature and/or other weather conditions such as cloud cover and solar radiation. This data 301 may come from sensors around the house 202 and in direct communication with the hub 205, or it may be supplied from an external source, such as a weather bureau, for example via the internet. The data 303 may also include data concerning internal temperatures within the house 202.

The hub 301 may receive total household electrical energy usage data 304 indicating the total electrical energy consumption of the household 202 at any time, from electricity consumption measurement devices 209 such as the Smartmeter or from "current clamps," or from any other suitable method.

The hub 301 may receive appliance usage data 305. This may be data coming from the CCM units 207 or from any other means of detecting the instantaneous electrical energy usage of appliances 203 in the household 202. This data 305 may also be calculated by the hub 205 applying disaggregation techniques to the total electrical energy usage data 304, or a combination of sources.

The hub 301 may receive user interface data 306 data directly from a user via a user interface. This may include data concerning appliance usage rules. These are rules which specify the limits of control of appliances 203. For example, a user may specify that a pool pump 208 must run for eight hours a day, but may not run between 21:00 pm and 6:00 am. The user interface data 306 may also include rules concerning energy source use, such as that solar electricity generation may not exceed the demand from the household 202.

The hub 301 may receive electrical energy supply cost data 307. This is the marginal cost of electricity used from any available source, usually the grid 201, the solar system 210, or a battery 211. The cost of grid electricity will be the tariff charged by the energy retailer, which may vary by time of day, day of week or time of year.

The hub 301 analyzes the received data in order to determine the manner in which the alternative electricity generation installation 210 should be controlled. The received data may also be analyzed in order to determine the manner in which one or more of the appliances 203 should be controlled.

In a simple version of the invention, the hub 301 may determine the current electrical energy demand of the household 202 from the received data. The hub 301 may also determine the current level of electrical energy being supplied by the solar power generation installation 210. The output of the hub 301 is solar power generation installation control data 315 which controls the solar power generation installation 210 to reduce output to ensure that the level of electrical energy being generated does not exceed the demand.

In the same or alternative versions of the invention, the hub 301 may use the received data to create a household energy and appliance use profile 310 which is a profile of the electrical energy use of each appliance 203 and of the household 202 overall, to the extent that the appliance usage data is available to the hub 301.

The hub 301 uses the profile of the household 202 in order to control energy usage to achieve the minimum overall cost for that energy. The hub 301 is able to build a profile of a household energy use for different weather conditions, time of day, day of week and home occupancy events.

The hub 301 uses the profile in order to determine appliance activation control data 311. When available electrical energy output from the solar generation installation 210 is greater than the household demand, the profile is examined to determine if the power state of any appliance 203 can be changed to increase current demand while ensuring that the appliance 203 meets the usage criteria which have been defined for that appliance 203, or determined as part of the household profile. In general, the increase in current demand will lead to a lower demand at a future time, when the solar power may not be available. For example, a pool pump 208 may be scheduled to run for eight hours in the evening. In the middle of the day, the dwelling 202 is unoccupied and the electrical energy demand from the household appliances 203 is low. The hub 205/301 commands the pool pump 208 to run while the solar power is available. The time that the pump 208 is run during the day means that the evening run time, which would be powered by electricity from the grid 201, can be shortened or eliminated. The solar power has a marginal cost of zero. Using the solar power thus reduces use of more expensive electrical energy supplied by the grid 201, saving money for the householder.

In the same or alternative versions of the invention, the hub 301 may use the profile and received data to undertake more complex modelling and prediction of the household demand and the level of available solar power. For example, the hub 301 may determine from the received data that the dwelling 202 is currently unoccupied and the air conditioning is not running, but from the profile a determination can be made that the dwelling 202 will be occupied later in the day, and that air conditioning will be required. There is available solar power beyond that being demanded by the household appliances 203. The profile indicates that the householder will return later in the day, and cooling will be required. At that time, more appliances 203 will be in use, increasing the household demand. The solar power available will also be less, such that air conditioning, if required, will need to be powered from the grid 201. In this circumstance, rather than reduce the output of the solar power installation 210, the hub 301 directs the air conditioning to run to pre-cool the dwelling 202 in order to increase the household electricity demand. When the householder returns at a later time, the air conditioning may be turned off, and is not immediately required to be turned on since the dwelling 202 is sufficiently cool. Although the air conditioning may have been run for a greater period overall, the cost to the householder is reduced since the marginal cost of the additional electrical energy used is zero, and less of the more expensive grid-supplied electricity is used.

Not all appliances 203 can be brought into use without user intervention, even in the unusual circumstance that all appliances 203 have an associated CCM 207. A clothes dryer would be an example, where there is no reason to run the dryer until clothes have been washed and placed in the dryer by a user.

There may be appliances 203 which a user would prefer to use, but will avoid or delay using where there is a cost in electricity consumption for that use. Again using the example of a clothes dryer, a householder may prefer to use the clothes dryer rather than hanging clothes to dry, but may choose to hang clothes to avoid the cost, whether monetary or in terms of environmental degradation, of using the dryer. The hub 301 may include a user interface which allows the householder to be informed that excess electrical energy is available, and that the dryer, for example, may be used without concern. The hub 301 may also provide a prediction as to when excess solar power will be available. The householder may then choose to delay use of the clothes dryer until solar power is available.

There are other appliances 203 which a householder may choose to run when the effective energy cost is nil, but otherwise would not run. It is known that running a swimming pool filter for extended times is likely to reduce chemical usage, but the running cost often means that running times are restricted to a minimum level. The hub 301 may control a swimming pool pump 208 to run at any time that excess solar power is available, regardless of how long it has already run for the day, while only running the pump 208 at times when excess solar power is not available when this is required to meet minimum daily operating times.

Other appliances 203 which a householder might wish to run whenever the appliance can be run with no additional energy cost would be air conditioning, and heat pump-based swimming pool heating equipment.

At all times the hub 205/301 continues to monitor the current electrical output from the solar power installation 210 to ensure that the solar power does not exceed the demand, and that unnecessary use is not made of grid electrical energy, regardless of profile predictions.

In the same or alternative versions of the invention, the hub 205/301 is in data communication with a plurality of similar hubs, each installed in households in the same geographic area. This communication may be direct, or via an intermediary device. Communication may be by any convenient means or combination of means, including without limitation, the public internet and a network of Smartmeters connected by a Zigbee mesh network. Each hub communicates solar generation data (being the current output of the household solar power installation), along with details on the size and type of the solar power installation. Here the hub may be installed in a household without a solar electricity generation installation. The hub receives the solar generation data from the similar hubs which are in households where there is a solar electricity generation installation. The hub uses this data to estimate the solar electricity supply which would be available to the household were a solar electricity generation installation in place. This estimate is made continuously to provide a simulated alternative electricity supply. The hub then runs as described above, as if the simulated supply were available. The hub records the amount of energy which would have been drawn from the simulated supply. This is combined with tariff data describing the cost of the electricity actually drawn from the grid. The hub then reports, in both monetary and energy terms, the savings which the householder would have made had a solar electricity generation installation been installed. In this case, the hub may not control appliances to operate in such a way that overall energy drawn from the grid is increased by such operations as pre-cooling the dwelling. The possible monetary and energy savings from such operations are calculated and reported to the householder. The householder or a third party may combine these predicted savings with the estimated cost of a solar electricity generation installation to determine the financial return on investment for such an installation.

The hub 205 may include the functionality of an In Home Display (IHD). At its simplest, an IHD displays the current usage of electrical energy by a household to the householder. Commonly, an IHD will also display the cost of this usage. This information may be used by the householder to modify their electricity usage to minimize costs. In an exemplary version, the hub 205 includes a display to present IHD information. In another exemplary version, the hub 205 communicates the IHD data to a separate unit for display. This separate unit may be a computing device with a communication capability, including, without limitation, an iPad, a tablet computer and a smartphone.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:
1. A hub device for installation in conjunction with one or more appliances, wherein:
  a. the appliances are provided with electrical energy from:
    (1) a mains electricity supply, and
    (2) an alternative electricity supply; and b. the electricity demand of the appliances is non-constant such that:
   (1) during a first time period the electrical energy available from the alternative electrical supply is greater than the electrical energy demand from the appliances, and
   (2) during a second time period the electrical energy available from the alternative electrical supply is less than the electrical energy demand from the appliances;

the hub device being configured to:
   I. control the alternative electricity supply such that during the first time period, the electrical energy available from the alternative electrical supply is reduced to a level which does not exceed the electrical energy demand from the appliances, and
   II. control a power use state of at least one of the appliances such that during the first time period, the hub device increases the electrical energy demand of the appliances to a level which does not exceed the electrical energy supply available from the alternative electrical supply.

2. The hub device of claim 1 wherein the control of the power use state of at least one of the appliances is such as to shift at least some electrical energy demand from the second time period to the first time period.

3. The hub device of claim 1 wherein the hub device controls the electrical energy available from the alternative electrical supply so as to minimize the cost of electricity supplied to the appliances.

4. The hub device of claim 1 wherein the hub device controls the power use state of at least one of the appliances between an "ON" state and an "OFF" state.

5. The hub device of claim 1 wherein the hub device's control of the power use state of at least one of the appliances includes the setting of a thermostat.

6. The hub device of claim 1 wherein the hub device:
   a. stores performance data about the prior performance of the alternative electrical energy supply,
   b. receives and stores environmental data describing the environment in which the hub device is operating,
   c. correlates prior performance data and environmental data, and
   d. predicts the future level of electrical energy which will be available from the alternative electrical energy supply, such prediction using the correlations of prior performance data and environmental data.

7. The hub device of claim 6 further configured to:
   a. profile household energy usage to predict future electrical energy demand by the electrical appliances, and
   b. use:
      (1) the predicted electrical energy demand, and
      (2) the predicted future level of electrical energy which will be available from the alternative electrical energy supply,
      to determine scheduling of:
      A. appliance activation, and
      B. alternative electrical energy supply use,
      in order to minimize use of electrical energy from the mains electricity supply.

8. The hub device of claim 6 wherein the environmental data includes one or more of temperature, behavior of a dwelling occupant, time of day, day of week, time of year, presence of a dwelling occupant, wind speed and cloud cover.

9. The hub device of claim 1 further configured to control the flow of electrical energy to a storage battery such that during the first time period the sum of:
   a. the flow of electrical energy to the storage battery, and
   b. the electrical energy available to the appliances from the alternative electrical supply,
approximately equals the electrical energy available from the alternative electrical energy supply.

10. The hub device of claim 1 wherein the alternative electrical energy supply consists of one or both of:
    a. a solar electrical power system, and
    b. a wind turbine electrical power system.

11. A hub device for installation in conjunction with one or more appliances, wherein:
    a. the appliances are provided with electrical energy from:
       (1) a mains electricity supply, and
       (2) an alternative electricity supply; and
    b. the electricity demand of the appliances is non-constant such that:
       (1) during a first time period the electrical energy available from the alternative electrical supply is greater than the electrical energy demand from the appliances, and
       (2) during a second time period the electrical energy available from the alternative electrical supply is less than the electrical energy demand from the appliances;

the hub device being configured to control:
    I. the flow of electrical energy to a storage battery,
    II. the electrical energy demand of the appliances, and
    III. the electricity supply of the alternative electricity supply,
such that during the first time period the sum of:
    A. the flow of electrical energy to the storage battery, and
    B. the electrical energy demand of the appliances,
approximately equals the electrical energy available from the alternative electrical energy supply.

12. The hub device of claim 11 wherein the hub device:
    a. stores performance data about the prior performance of the alternative electrical energy supply,
    b. receives and stores environmental data describing the environment in which the hub device is operating,
    c. correlates prior performance data and environmental data, and
    d. predicts the future level of electrical energy which will be available from the alternative electrical energy supply, such prediction using the correlations of prior performance data and environmental data.

13. The hub device of claim 12 further configured to:
    a. profile household energy usage to predict future electrical energy demand by the electrical appliances, and
    b. use:
       (1) the predicted electrical energy demand, and
       (2) the predicted future level of electrical energy which will be available from the alternative electrical energy supply,
       to determine scheduling of:
       A. appliance activation, and
       B. alternative electrical energy supply use,
       in order to minimize use of electrical energy from the mains electricity supply.

14. The hub device of claim 12 wherein the environmental data includes one or more of temperature, behavior of a dwelling occupant, time of day, day of week, time of year, presence of a dwelling occupant, wind speed and cloud cover.

15. The hub device of claim 11 wherein the alternative electrical energy supply consists of one or both of:
   a. a solar electrical power system, and
   b. a wind turbine electrical power system.

16. A method of control of an alternative electricity supply installed in conjunction with one or more appliances, the appliances being provided with electrical energy from a mains electricity supply and by the alternative electricity supply, the alternative electricity supply being a solar electrical power system and/or a wind turbine electrical power system, the method including the step of maintaining the output electrical energy of the alternative electricity supply at a level which does not exceed the electrical energy demand of the appliances.

17. The method of claim 16 further including the steps of:
   a. increasing the electrical energy demand of at least one of the appliances, while
   b. maintaining the output electrical energy of the alternative electricity supply at a level which does not exceed the electrical energy demand of the appliances.

18. The method of claim 16 further including the step of reducing the output electrical energy of the alternative electricity supply in order to maintain the output electrical energy of the alternative electricity supply at a level which does not exceed the electrical energy demand of the appliances.

19. The method of claim 16 further including the steps of:
   a. storing performance data about the prior performance of the alternative electricity supply;
   b. receiving environmental data describing the environment in which the alternative electricity supply is operating;
   c. correlating the prior performance data and the environmental data; and
   d. predicting the future level of electrical energy which will be available from the alternative electricity supply, such prediction using the correlations of the prior performance data and the environmental data.

20. The method of claim 19 further including the steps of:
   a. including profiling household energy usage to predict future electrical energy demand by the electrical appliances, and
   b. using:
      (1) the predicted electrical energy demand, and
      (2) the predicted future level of electrical energy which will be available from the alternative electricity supply,
   to determine scheduling of:
      A. appliance activation, and
      B. alternative electrical energy supply use,
   in order to minimize use of electrical energy from the mains electricity supply.

* * * * *